(12) United States Patent
Milo et al.

(10) Patent No.: US 11,814,025 B2
(45) Date of Patent: Nov. 14, 2023

(54) WHEEL CHOCK

(71) Applicants: Thomas Milo, Cuyahoga Falls, OH (US); Angelina Milo, Cuyahoga Falls, OH (US)

(72) Inventors: Thomas Milo, Cuyahoga Falls, OH (US); Angelina Milo, Cuyahoga Falls, OH (US)

(*) Notice: Subject to any disclaimer, the term of this patent is extended or adjusted under 35 U.S.C. 154(b) by 336 days.

(21) Appl. No.: 17/005,474

(22) Filed: Aug. 28, 2020

(65) Prior Publication Data
US 2021/0061239 A1 Mar. 4, 2021

Related U.S. Application Data

(60) Provisional application No. 62/892,732, filed on Aug. 28, 2019.

(51) Int. Cl.
*B60T 3/00* (2006.01)
*B64F 1/16* (2006.01)
*B66F 7/24* (2006.01)

(52) U.S. Cl.
CPC .............. *B60T 3/00* (2013.01); *B64F 1/16* (2013.01); *B66F 7/246* (2013.01)

(58) Field of Classification Search
CPC ..... A63C 17/01; A63C 17/017; A63C 17/014; A63C 17/015; E01F 15/148; E01F 15/006; E01F 9/70; E01F 9/692; E01F 9/588; E01F 9/553; E01F 15/086; B60T 3/00; B66F 7/243; B66F 7/246; B64F 1/16; A45B 2023/0012; E04H 12/2246; E04H 12/2238; B62B 5/0083; B65F 1/1468; B60B 33/0084; B60B 33/0086

USPC ............................................... 188/32
See application file for complete search history.

(56) References Cited

U.S. PATENT DOCUMENTS

| 863,122 | A | * | 8/1907 | Weber | B66F 7/246 |
| | | | | | 482/77 |
| 939,249 | A | * | 11/1909 | Hageman | B61J 3/10 |
| | | | | | 254/38 |
| 1,401,350 | A | * | 12/1921 | Monahan | B60T 1/14 |
| | | | | | 188/4 R |

(Continued)

FOREIGN PATENT DOCUMENTS

| CN | 112406817 A * | 2/2021 | ............ B60T 3/00 |
| DE | 202016103587 U1 * | 11/2016 | ............ B64F 1/16 |

(Continued)

*Primary Examiner* — Taylor Morris
(74) *Attorney, Agent, or Firm* — Brennan, Manna & Diamond, LLC

(57) ABSTRACT

An improved wheel chock for use with wheeled vehicles, such as aircraft, that is both adjustable in size and that is configured for relatively easy transport, deployment and maneuverability by a single user is disclosed. The wheel chock preferably comprises a lifting end, a rolling end, at least one segment positioned between the lifting end and the rolling end, and a unique and adjustable wheel assembly. The adjustable wheel assembly may be at least partially housed in a pocket formed in the rolling end of the improved wheel chock. The wheel chock may further comprise a tether and an opening for removably attaching said wheel chock to a second wheel chock to prevent unwanted movement of a vehicle wheel in both forward and reverse directions.

8 Claims, 21 Drawing Sheets

(56) References Cited

U.S. PATENT DOCUMENTS

| | | | | |
|---|---|---|---|---|
| 1,419,067 A * | 6/1922 | McCarthy | B66F 7/246 | 254/84 |
| 1,837,657 A * | 12/1931 | Fedderman | B60T 3/00 | 144/353 |
| 1,970,159 A * | 8/1934 | Zehnbauer | B66F 7/246 | 280/43.24 |
| 2,552,804 A * | 5/1951 | Morris | B66F 7/246 | 280/137.5 |
| 2,608,312 A * | 8/1952 | Luther, V | B66F 7/246 | 414/430 |
| 2,666,502 A * | 1/1954 | Fee | B60T 3/00 | 254/2 B |
| 2,720,285 A * | 10/1955 | Taylor | B60T 3/00 | 188/32 |
| 2,992,704 A * | 7/1961 | Showker | B64F 1/16 | D12/217 |
| 4,121,788 A * | 10/1978 | McMahon | B64F 1/22 | 244/50 |
| 4,202,558 A * | 5/1980 | Olschewski | A63C 17/01 | 280/11.28 |
| 4,543,685 A * | 10/1985 | Kassai | B60B 33/0078 | 16/35 R |
| 4,726,727 A * | 2/1988 | Tyler | B66F 7/246 | 188/4 R |
| 5,044,645 A * | 9/1991 | Eltvik | B66F 7/246 | 280/79.4 |
| 5,220,740 A * | 6/1993 | Brault | F16M 11/42 | 40/607.1 |
| 5,354,049 A * | 10/1994 | Matherne | A63B 71/023 | 473/484 |
| 5,447,406 A * | 9/1995 | Voss | B66F 7/246 | 254/8 R |
| 5,489,107 A * | 2/1996 | Kho | A45C 5/143 | 280/30 |
| 5,875,578 A * | 3/1999 | Grewe | E01F 9/662 | 40/608 |
| 5,878,518 A * | 3/1999 | Grewe | G09F 15/0087 | 40/607.13 |
| 6,174,103 B1 * | 1/2001 | Stroman | E01F 9/70 | 404/15 |
| D448,338 S * | 9/2001 | Duvall | A63C 17/01 | D12/217 |
| 6,681,901 B2 * | 1/2004 | Agtuca | B60T 3/00 | 188/4 R |
| 7,156,403 B2 * | 1/2007 | Abbott | B62B 5/0083 | 280/79.11 |
| 7,284,942 B1 * | 10/2007 | Allen | B62H 3/08 | 414/430 |
| 7,584,563 B2 * | 9/2009 | Hillstrom | G09F 15/0056 | 40/607.01 |
| 8,215,866 B2 * | 7/2012 | Whitford | F41H 5/14 | 404/9 |
| 8,459,670 B1 * | 6/2013 | Tizzone | A63C 17/015 | 280/87.05 |
| 8,545,126 B1 * | 10/2013 | Alsaffar | E01F 15/086 | 404/6 |
| 9,095,766 B1 * | 8/2015 | Christie | A63C 17/01 | |
| 9,718,658 B1 * | 8/2017 | Winston | B66F 7/246 | |
| 2003/0021661 A1 * | 1/2003 | Fluss | B62B 5/049 | 414/430 |
| 2004/0226780 A1 * | 11/2004 | Olson | B60T 3/00 | 188/36 |
| 2006/0016643 A1 * | 1/2006 | Blumenthal | B60T 3/00 | 188/4 R |
| 2007/0089265 A1 * | 4/2007 | Lin | B60B 33/025 | 16/35 R |
| 2007/0166137 A1 * | 7/2007 | Toal | B66F 7/246 | 414/430 |
| 2012/0068427 A1 * | 3/2012 | Alva | A63C 17/015 | 280/87.05 |
| 2015/0246798 A1 * | 9/2015 | Guzman Restori | B66F 7/246 | 14/72.5 |
| 2019/0103022 A1 * | 4/2019 | Kelly | G08G 1/0955 | |
| 2019/0202418 A1 * | 7/2019 | Waddell | B60T 3/00 | |

FOREIGN PATENT DOCUMENTS

| | | | | |
|---|---|---|---|---|
| EP | 2589519 A1 * | 5/2013 | | B60P 3/077 |
| FR | 2394423 A1 * | 1/1979 | | B60T 3/00 |
| FR | 2641748 A1 * | 7/1990 | | B60T 3/00 |
| FR | 2832112 A1 * | 5/2003 | | B60T 3/00 |
| FR | 2873351 A1 * | 1/2006 | | B60T 3/00 |
| GB | 2229153 A * | 9/1990 | | B60R 99/00 |
| KR | 20220001636 U * | 7/2022 | | B60T 3/00 |
| WO | WO-2010118768 A1 * | 10/2010 | | B60T 3/00 |
| WO | WO-2016112458 A1 * | 7/2016 | | B60P 3/077 |
| WO | WO-2017200475 A1 * | 11/2017 | | B60R 25/093 |

* cited by examiner

WHEEL CHOCK

CROSS-REFERENCE TO RELATED APPLICATION

The present application claims priority to, and the benefit of, U.S. Provisional Application No. 62/892,732, which was filed on Aug. 28, 2019 and is incorporated herein by reference in its entirety.

FIELD OF THE INVENTION

The present invention relates generally to a chock used to restrict movement of a wheeled vehicle (e.g., an aircraft, tractor trailer, truck, etc.) and, more specifically, to a wheel chock that is easily adjustable in length and that has a flexible wheel assembly and other innovative design features to allow for relatively easy handling and deployment. The improved wheel chock of the present invention is particularly well suited for use with aircraft. Accordingly, the present specification makes specific reference thereto. However, it is to be appreciated that aspects of the present invention are also equally amenable to other like applications and devices.

BACKGROUND OF THE INVENTION

Wheel chocks are necessary safety equipment that are useful for securing parked aircraft to prevent undesired movement of the aircraft, which could result in injury to a person or damage to the aircraft or other property. While the use of wheel chocks to prevent unwanted movement of the wheeled vehicle that they are being used to secure is generally known in the art, such prior art wheel chocks suffer from a number of limitations and performance deviations that are inherently associated with the necessary bulk and weight that the wheel chocks require to safely secure larger wheeled vehicles, such as aircraft, tractor trailers, etc.

More specifically, existing wheel chocks are typically bulky, heavy, and not ergonomically designed for easy transport and/or deployment. For example, many aircraft related wheel chocks typically weigh between 40-50 pounds or more a piece, and are typically deployed in pairs. Therefore, the user must transport approximately 80-100 pounds of chock, oftentimes over relatively long distances and in extreme weather conditions, to secure a single wheel of an aircraft. When you factor in a typical work shift of 8-12 hours, it becomes apparent that the continuous transportation and deployment of wheel chocks will impose a physical toll on even the fittest of employees or users.

Further, because of the weight and bulk of existing wheel chocks, many users will tend to drag the chocks along the surface (such as a concrete runway), which can not only result in damage to the chocks, but also additional frictional forces (i.e., between the chock and the surface that it is being dragged across) that must be overcome by the user which further increases the fatigue factor. Additionally, the damage to the chock tends to result in portions of the chock breaking off and being left on the runway, which is also highly undesirable. More specifically, the debris from the chock left on a runway can be pulled into an aircraft's engines or other mechanical systems, thereby resulting in significant damage thereto and the potential to jeopardize the operation of the aircraft and the lives on board. Damaged chocks must also be replaced, which increase the overall operational costs of the organization or facility utilizing the wheel chocks.

Additionally, while existing chocks come in different sizes and fixed lengths, the size and/or length of the chock needed for a particular application may vary depending on the size and or type of vehicle being restrained by the same, such as an aircraft. Consequently, a chock user is typically required to maintain a wide array of chocks having different sizes and/or lengths, which can be costly to acquire, maintain and warehouse.

Therefore, there is a long felt need in the art for an improved wheel chock that is more easily transportable and deployable by a single user, and that can be used in conjunction with larger vehicles, such as airplanes. There is also a long felt need in the art for an improved chock whose length can be extended and or reduced in a relatively simple and time efficient manner, thereby reducing the number of wheel chocks that a user must purchase, maintain and/or warehouse.

The present invention discloses an improved wheel chock for use with wheeled vehicles, such as aircraft, that is adjustable in size and that may be easily connected to a second chock to fully secure the wheeled vehicle. Additionally, the improved wheel chock is configured for relatively easy transport, deployment and maneuverability by a single user, without the need to drag the chock along the ground, which creates unnecessary friction, increases the wear and tear on the wheel chock, and can result is chock debris causing damage to aircraft and/or individuals in the same vicinity.

SUMMARY OF THE INVENTION

The following presents a simplified summary in order to provide a basic understanding of some aspects of the disclosed innovation. This summary is not an extensive overview, and it is not intended to identify key/critical elements or to delineate the scope thereof. Its sole purpose is to present some concepts in a simplified form as a prelude to the more detailed description that is presented later.

The subject matter disclosed and claimed herein, in one aspect thereof, comprises an improved wheel chock for securing wheels on a vehicle, such as an aircraft, and that is adjustable in size to accommodate a wide array of different sized vehicles and/or aircraft, thereby reducing the need to purchase, maintain and warehouse a large number of different sized chocks for different applications. The improved wheel chock is also easily and removably attachable to a second chock to prevent unwanted movement of the secured wheel in either direction. Additionally, the improved wheel chock is configured for relatively easy transport, deployment and maneuverability by a single user, without the need to drag the chock along the ground, which creates unnecessary friction, increases the wear and tear on the wheel chock, and can result is chock debris being scattered about the area.

More specifically, in one embodiment of the present invention, the improved wheel chock comprises a chock portion and an adjustable wheel assembly. The chock portion comprises a lifting end and a rolling end. The lifting end comprises a handle and a hole or opening for receiving one end of a tether. The rolling end is preferably mateable with the lifting end and comprises a wheel assembly housing, a curved portion, and a rear guard. The chock portion may further comprise a plurality of segments for extending or reducing the overall length of the improved wheel chock. Each one of the plurality of segments may interlock together with an adjacent segment, the lifting end, or the rolling end, and fit generally between the lifting end and the rolling end. The adjustable wheel assembly comprises a shaft, a pair of bushings rotatably connecting the shaft to the wheel assembly housing, and a pair of wheels rotatably connected to the shaft via a pair of bearings.

In an alternative embodiment of the present invention, the adjustable wheel assembly comprises a shaft, a pin element, a shaft offset portion, and an adjusting component. The adjustable wheel assembly is retained within the wheel assembly housing, and the pin element is in line with and protrudes perpendicularly out of the shaft away from the housing. The pin element may further comprise a spacer, such as a washer and/or a bushing. The adjusting component is adjustably retained by the shaft offset portion, and generally comprises a fastening element, a washer, and a flexible element. The adjustable wheel assembly further comprises a pair of wheels rotatable attached to the shaft via a pair of bearings. The pin element prevents over rotation of the wheel assembly through contact with the rear guard of the rolling end of the improved wheel chock.

To the accomplishment of the foregoing and related ends, certain illustrative aspects of the disclosed innovation are described herein in connection with the following description and the annexed drawings. These aspects are indicative, however, of but a few of the various ways in which the principles disclosed herein can be employed and is intended to include all such aspects and their equivalents. Other advantages and novel features will become apparent from the following detailed description when considered in conjunction with the drawings.

BRIEF DESCRIPTION OF THE FIGURES

While the specification concludes with claims particularly pointing out and distinctly claiming the present invention, it is believed that the present invention will be better understood from the following description in conjunction with the accompanying Figures, in which like reference numerals identify like elements, and wherein:

DETAILED DESCRIPTION

Figure 1:
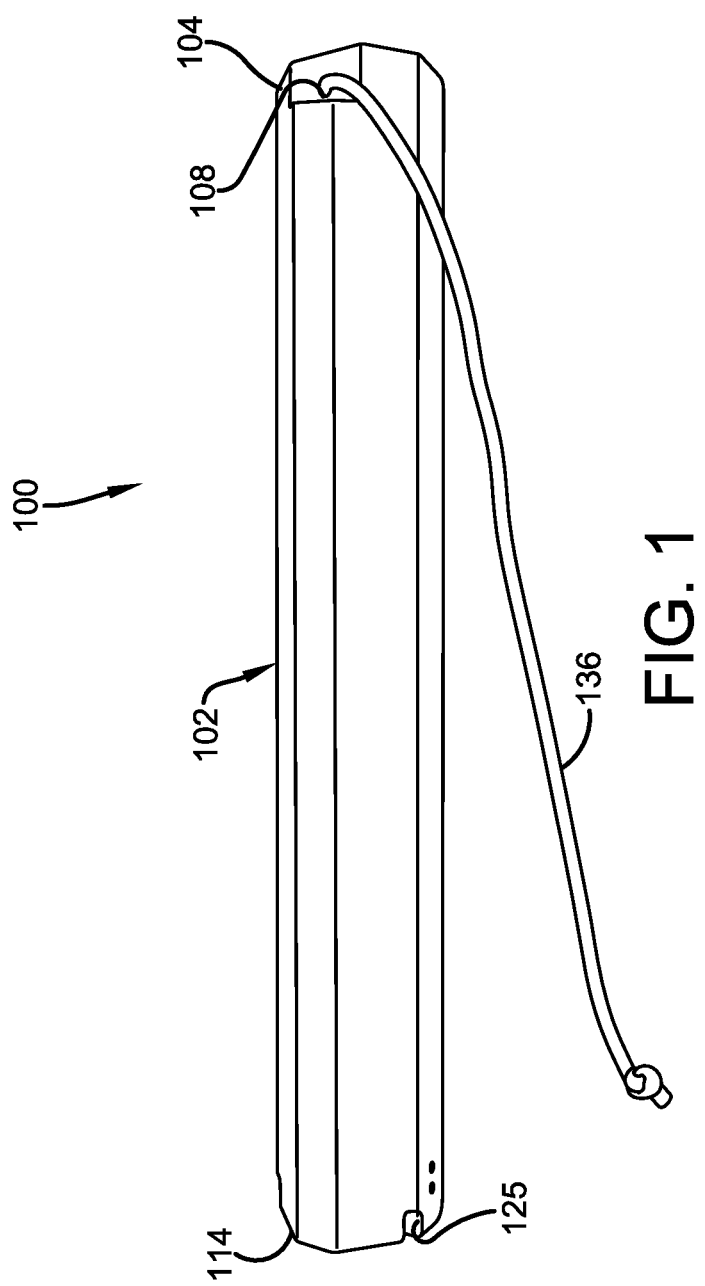
FIG. 1 illustrates a perspective view of one potential embodiment of the improved wheel chock of the present invention.

In the following detailed description of the preferred embodiment, reference is made to the accompanying drawings that form a part hereof, and in which is shown by way of illustration, and not by way of limitation, a specific preferred embodiment in which the invention may be practiced. It is to be understood that other embodiments may be utilized and that changes may be made without departing from the spirit and scope of the present invention.

The subject matter disclosed and claimed herein, in one aspect thereof, comprises an improved wheel chock for securing wheels on a vehicle, such as an aircraft. The improved wheel chock is both adjustable in size to accommodate a wide array of different sized vehicles and/or aircraft, thereby reducing the need to purchase, maintain and warehouse a large number of different sized chocks for different applications, and the improved wheel chock is configured for relatively easy transport, deployment and maneuverability by a single user.

Turning now to the drawings, FIGS. 1-12 disclose a first embodiment of an improved wheel chock 100 of the present invention. More specifically, improved wheel chock 100 comprises a chock portion 102 and an adjustable or flexible wheel assembly 150. The chock portion 102 is typically manufactured from a heavy duty, flexible material, such as urethane, but that is not meant as a limitation as any similar plastic, synthetic, or natural material with similar qualities may be used as well. The chock portion 102 comprises a front or lifting end 104, and a rear or rolling end 114. The chock portion 102 may further comprise a plurality of segments 126 for positioning between the lifting end 104 and a rolling end 114 to extend the length of the wheel chock 100 as desired, and as explained more fully infra and shown in FIGS. 13-21.

Figure 2:
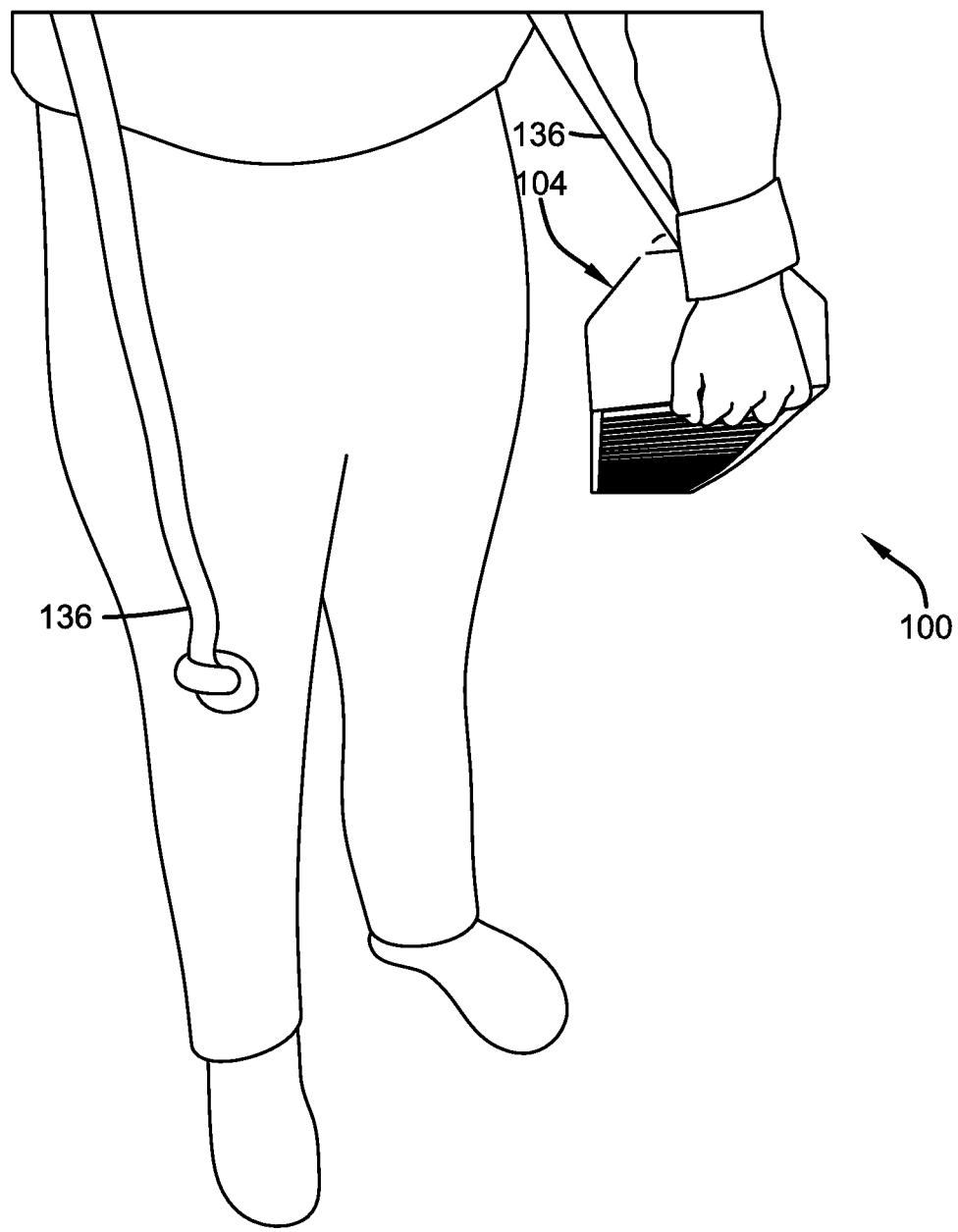
FIG. 2 illustrates an end perspective view of the improved wheel chock of FIG. 1 being handled by a user.
Figure 3:
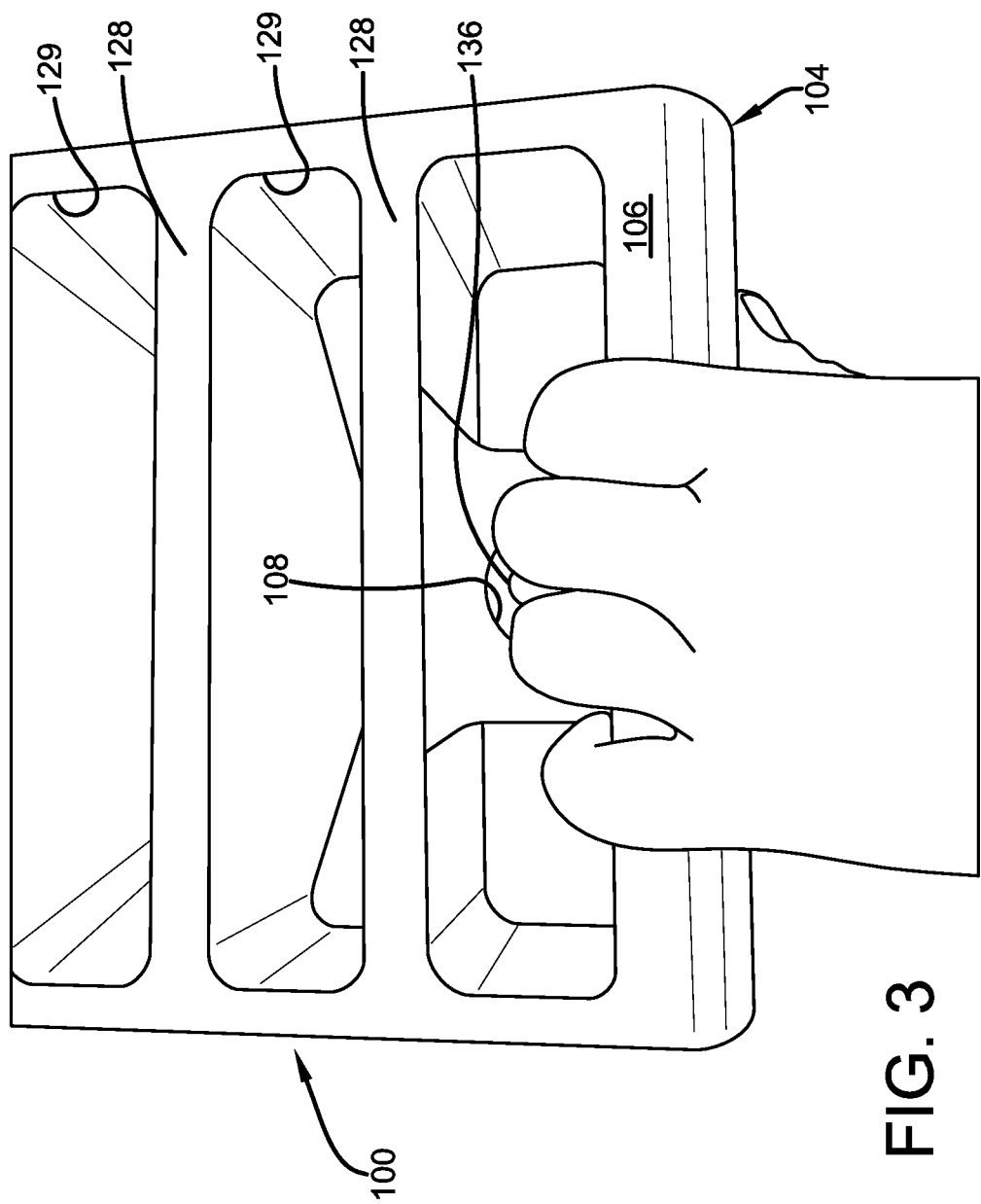
FIG. 3 illustrates a bottom perspective view of a handle of a lifting end of the wheel chock of FIG. 1.
Figure 16:
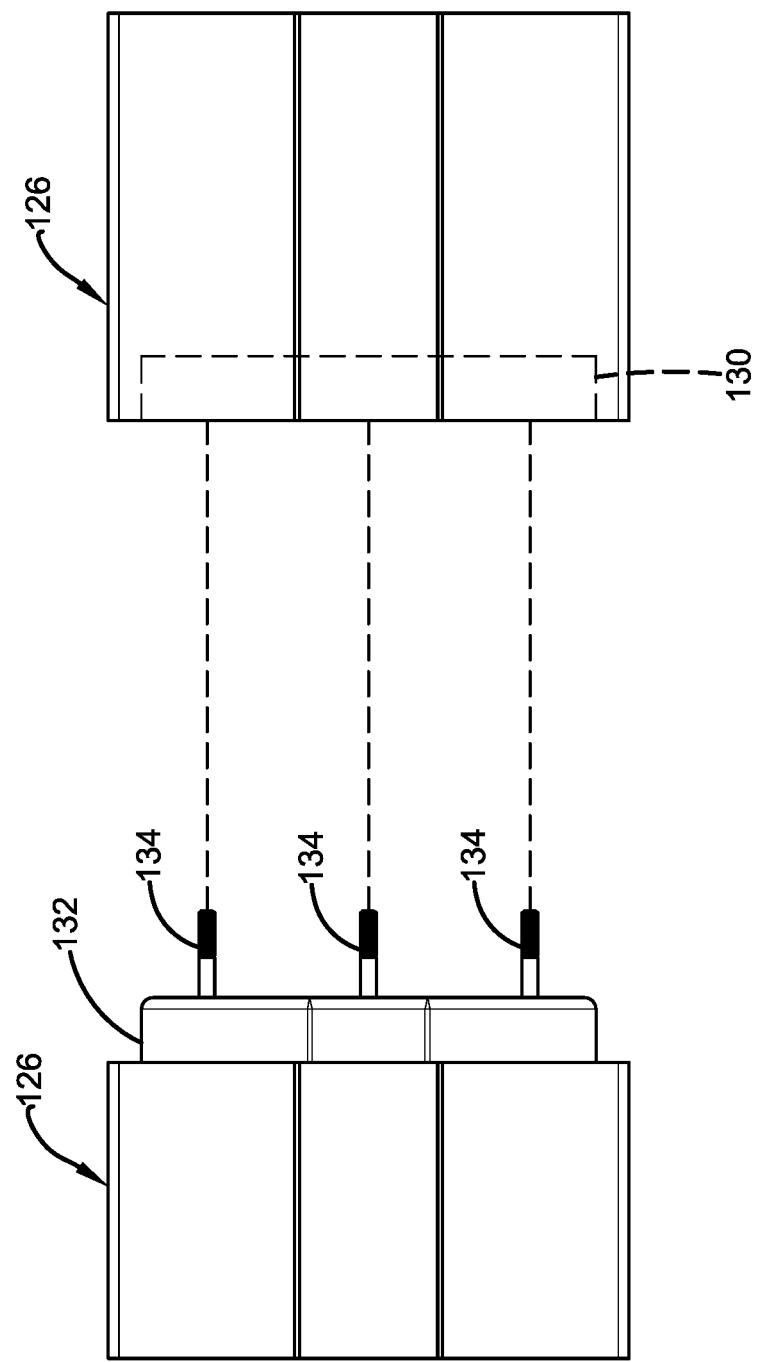
FIG. 16 illustrates a partial perspective exploded view of two segments of the improved wheel chock of FIG. 13.
Figure 17:
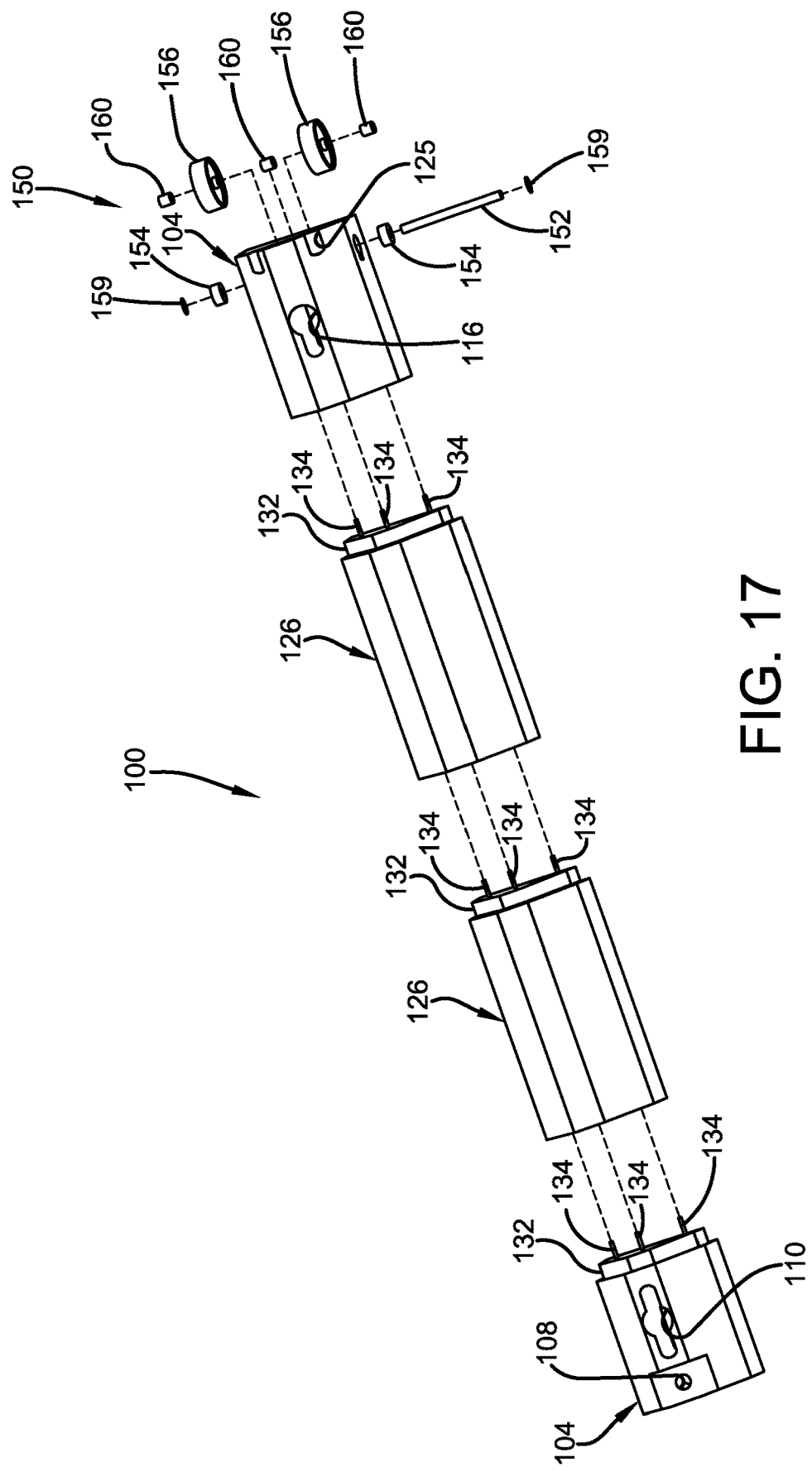
FIG. 17 illustrates an exploded, top perspective view of the improved wheel chock of FIG. 13.

The lifting end 104 comprises a handle 106, a tether tie hole or opening 108, and an attachment hole or opening 110. As best illustrated in FIG. 3, the handle 106 is preferably machine grooved or molded into an outside edge of the lifting end 104, and is designed to allow a user to grip and lift the lifting end 104 of improved wheel chock 100, as best shown in FIG. 2. The lifting end 104 further comprises a protruding portion for mating with either the rolling end 114, or one of the plurality of segments 126 as illustrated in FIGS. 16 and 17. Alternatively, the lifting end 104 may further comprise a receiving pocket for mating with either the rolling end 114 or one of the plurality of segments 126.

The improved wheel chock 100 of the present invention may further comprise a tether 136, such as a rope, chain, or cordage, wherein one end of the tether 136 is knotted and retained by the tether tie hole or opening 108, as best shown in FIGS. 1 and 3. The tether 136 may then be used to transport, deploy and/or maneuver improved wheel chock 100 into position. Additionally, the opposite end of the tether 136, or a second tether may be retained by the attachment hole or opening 110 as discussed infra to enable the user to more easily transport improved wheel chock 100, or to removably attach a first wheel chock 100 to a second wheel chock 100 to prevent unwanted movement of a vehicle wheel (not shown) in either direction (i.e., forward or backward).

Figure 4:
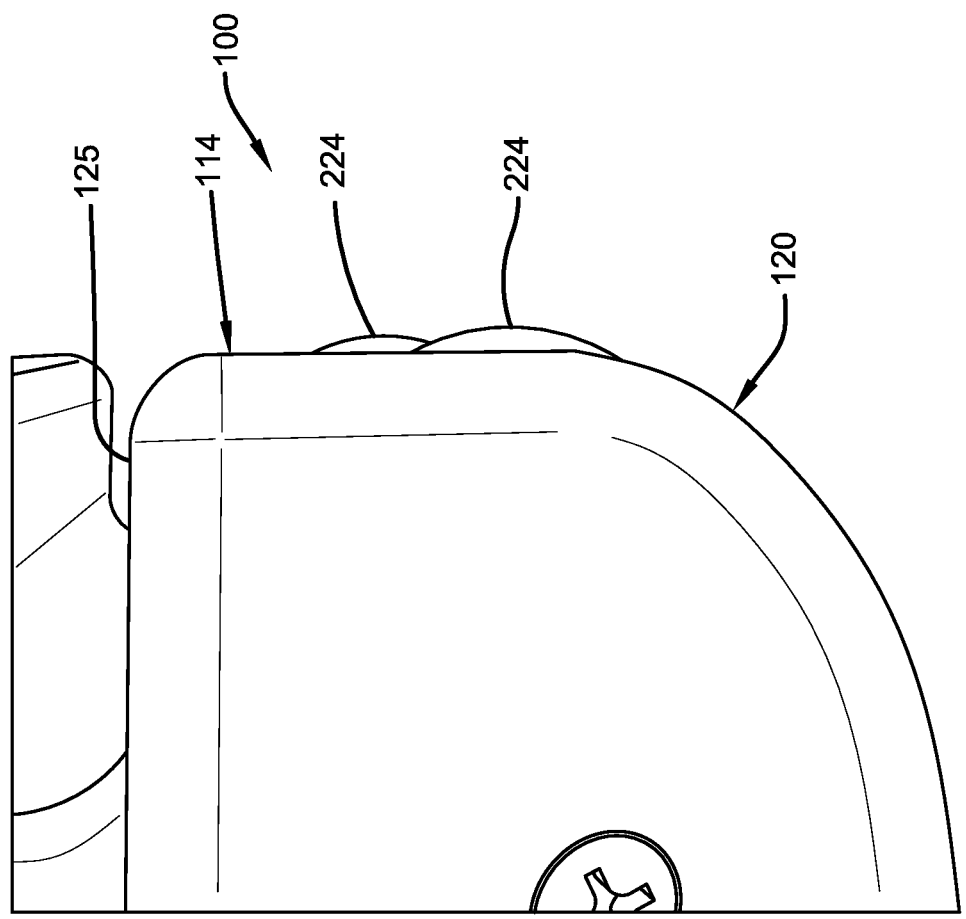
FIG. 4 illustrates a close up perspective view of a rolling end of the improved wheel chock of FIG. 1.
Figure 5:
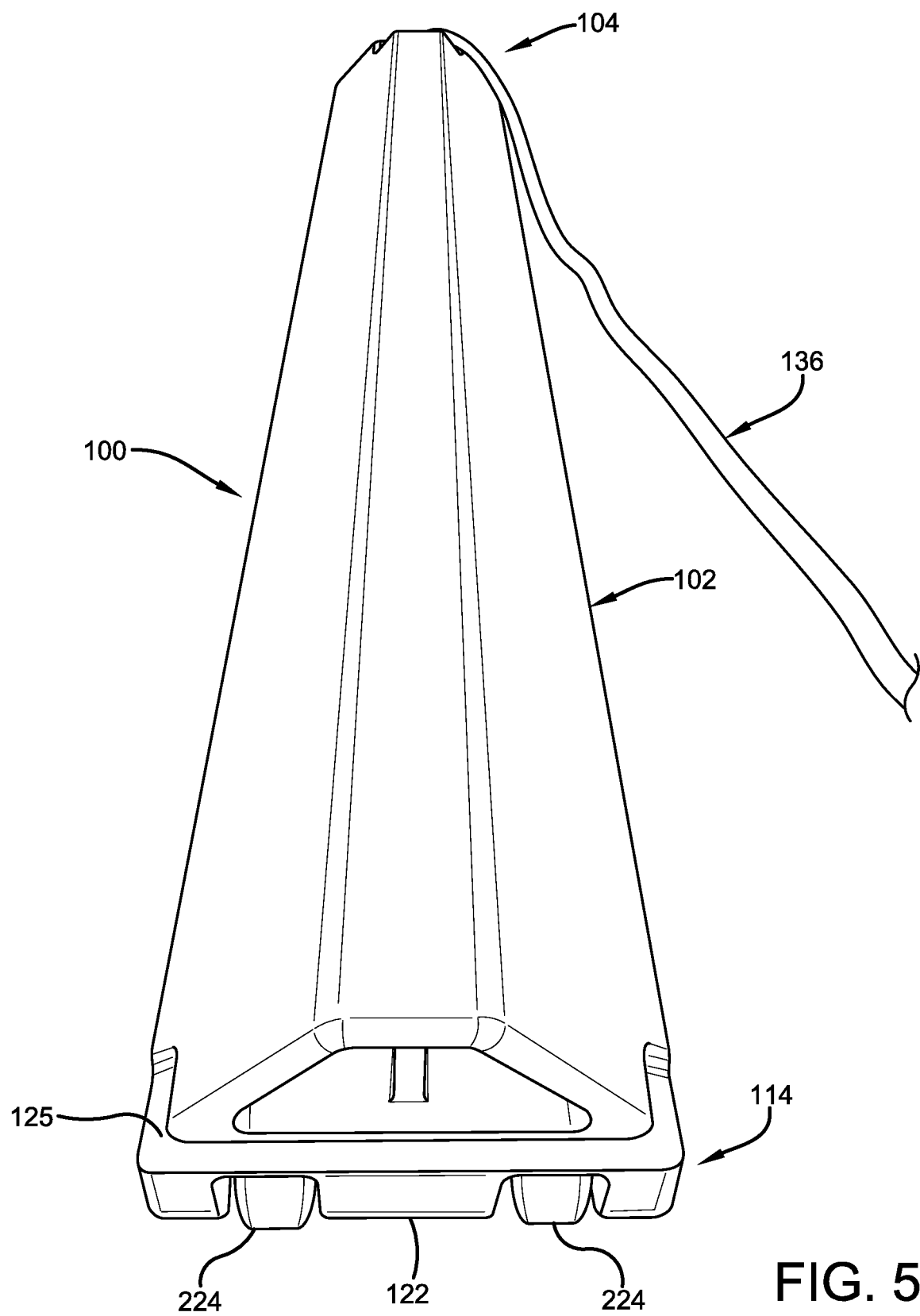
FIG. 5 illustrates a rear perspective view of the improved wheel chock of FIG. 1, and its adjustable wheel assembly.
Figure 6:
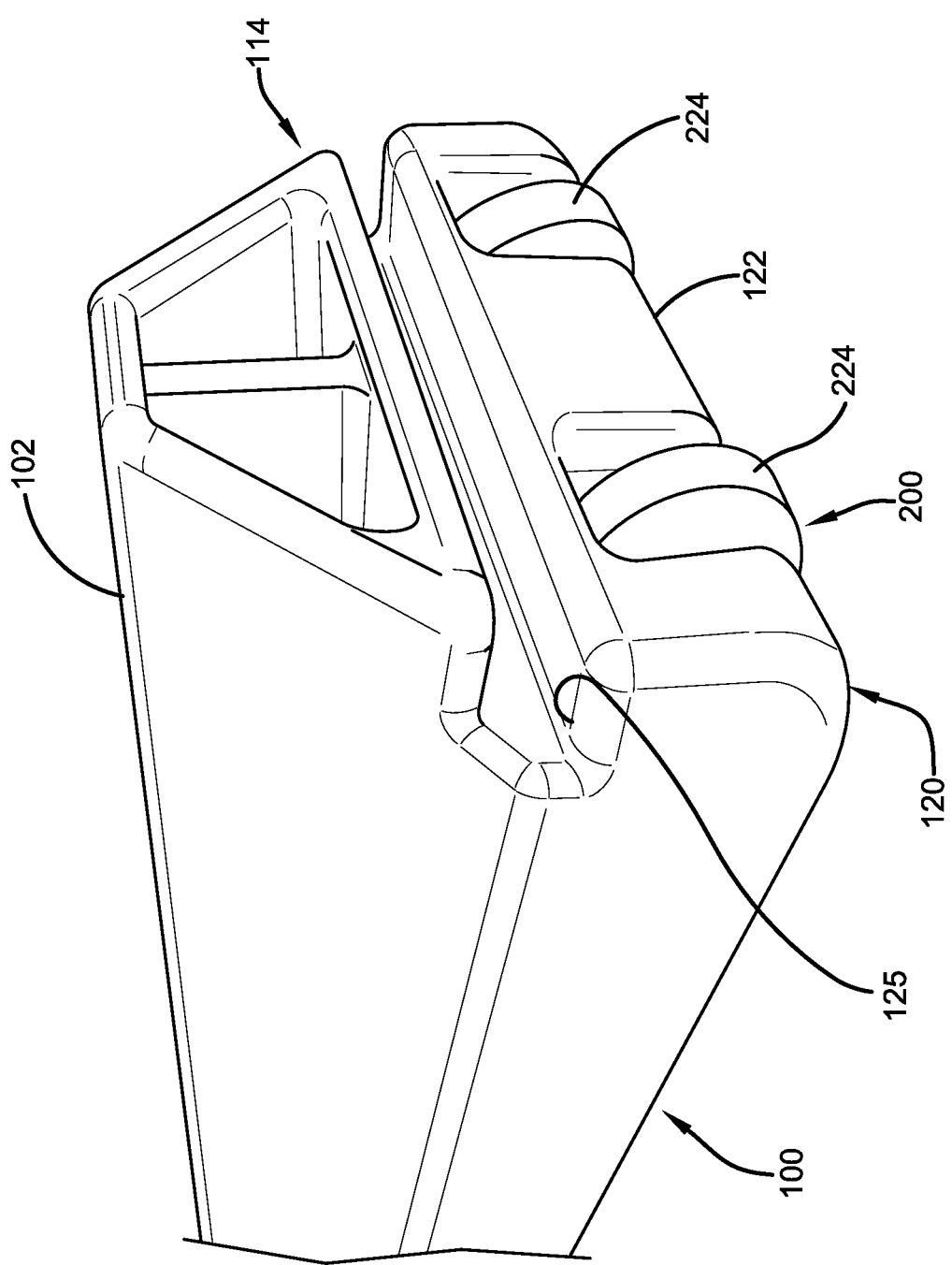
FIG. 6 illustrates a close up rear perspective view of the rolling end of the improved wheel chock of FIG. 1.
Figure 7:
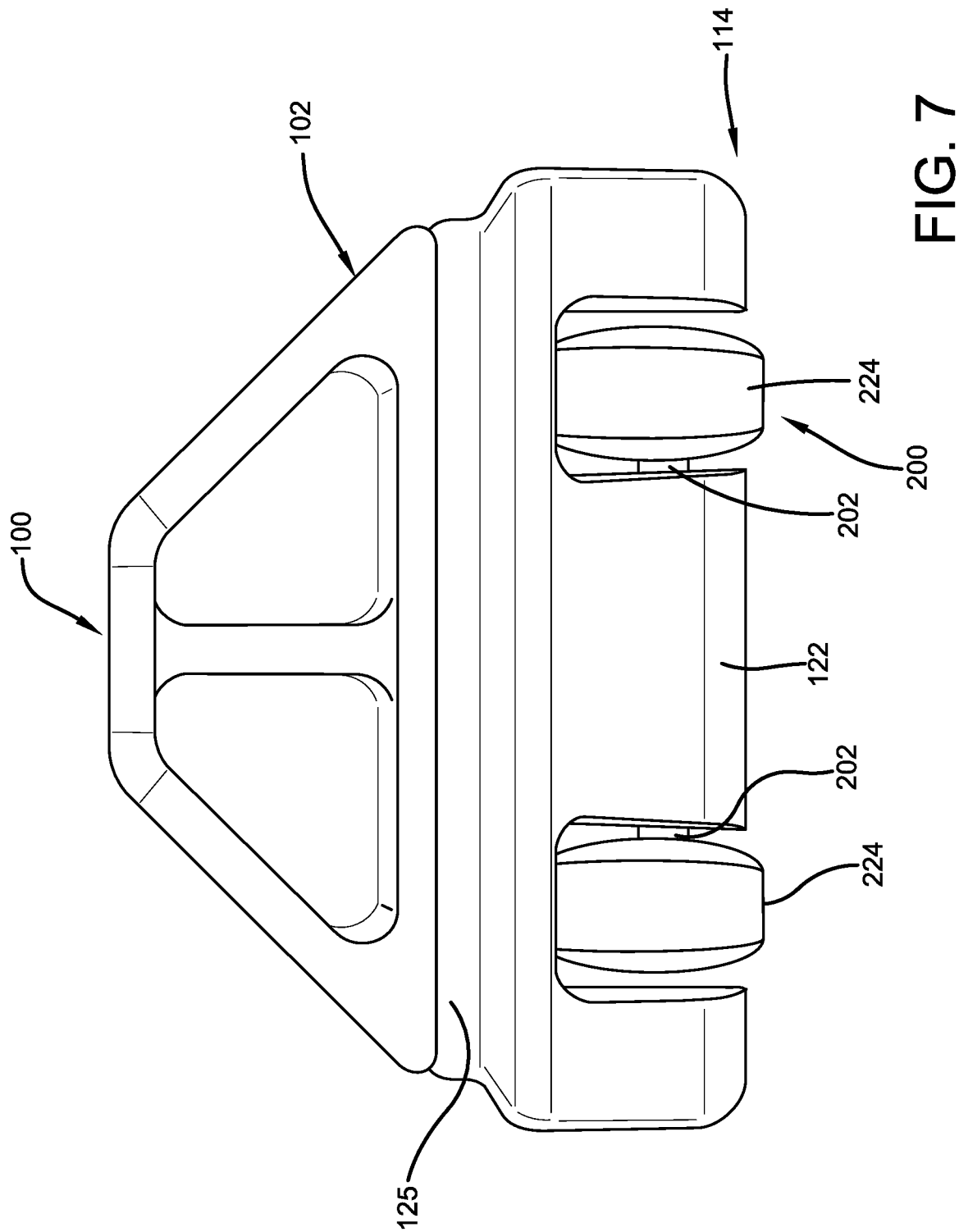
FIG. 7 illustrates a close up rear perspective view of the rolling end of the improved wheel chock of FIG. 1 and its adjustable wheel assembly.
Figure 8:
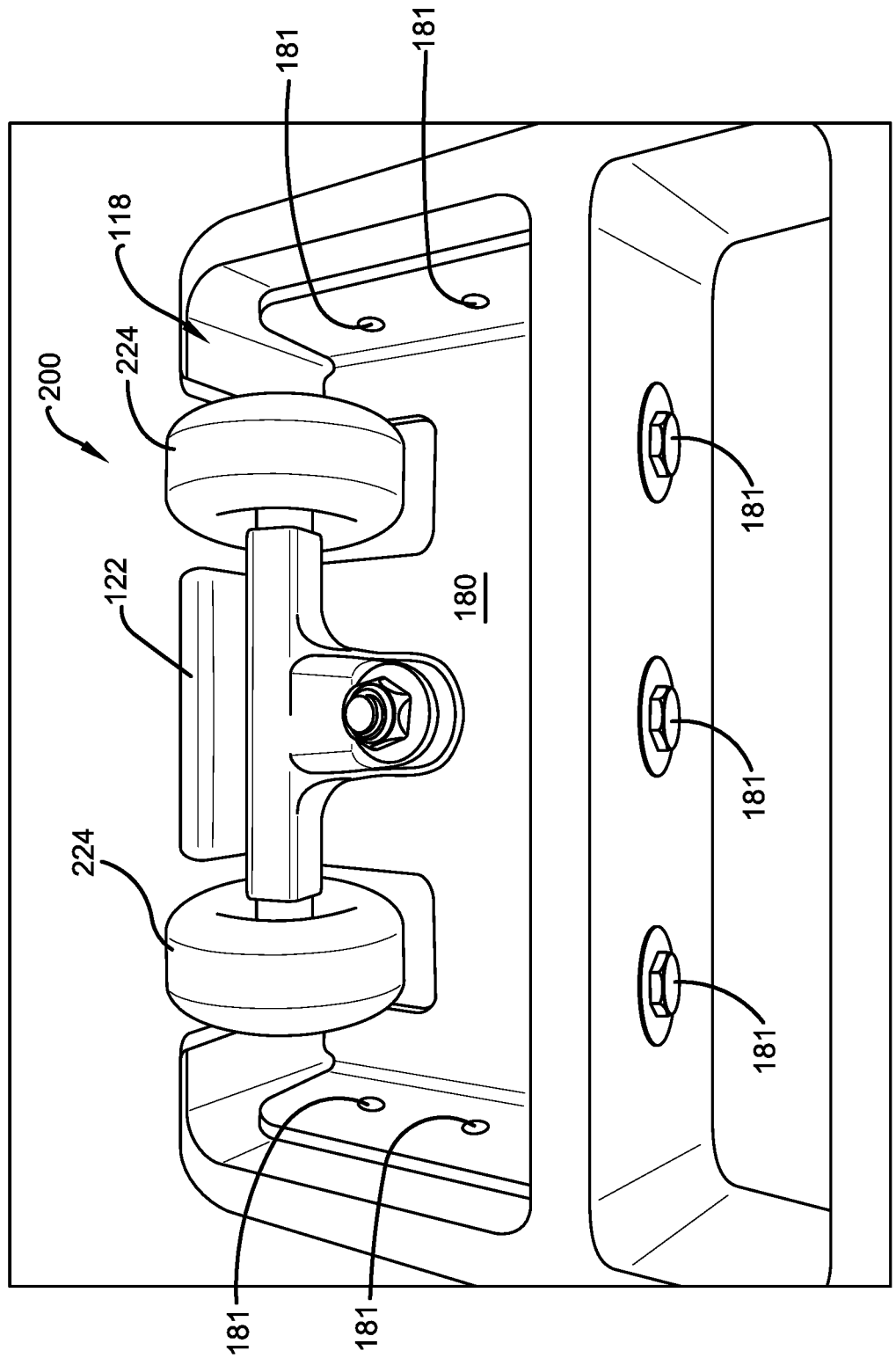
FIG. 8 illustrates a bottom perspective view of the rolling end and the adjustable wheel assembly of the improved wheel chock of FIG. 1.
Figure 9:
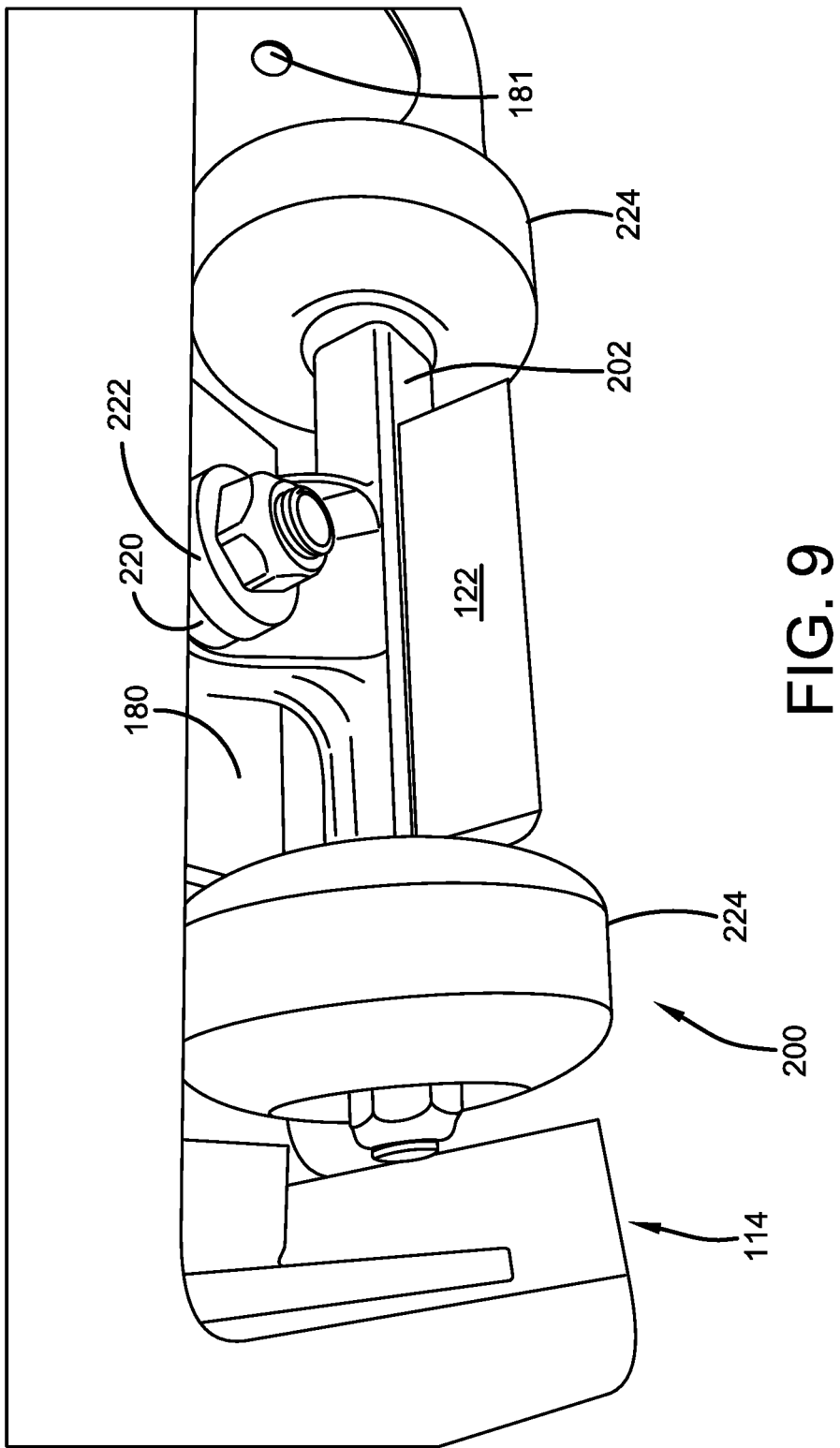
FIG. 9 illustrates an end perspective view of the rolling end and the adjustable wheel assembly of the improved wheel chock of FIG. 1.
Figure 14:
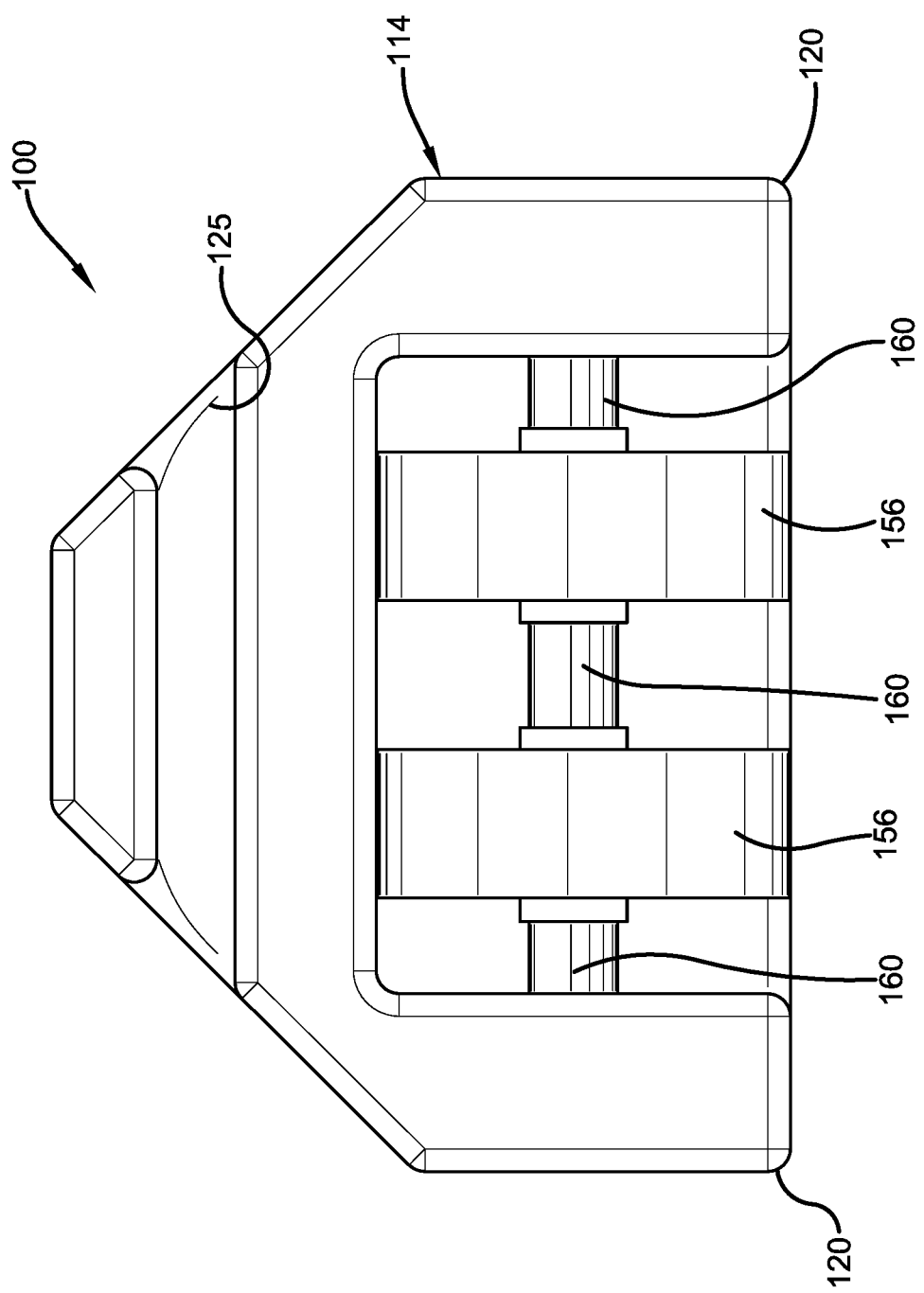
FIG. 14 illustrates an end perspective view of the rolling end and a wheel adjusting assembly of the wheel chock of FIG. 13.
Figure 15:
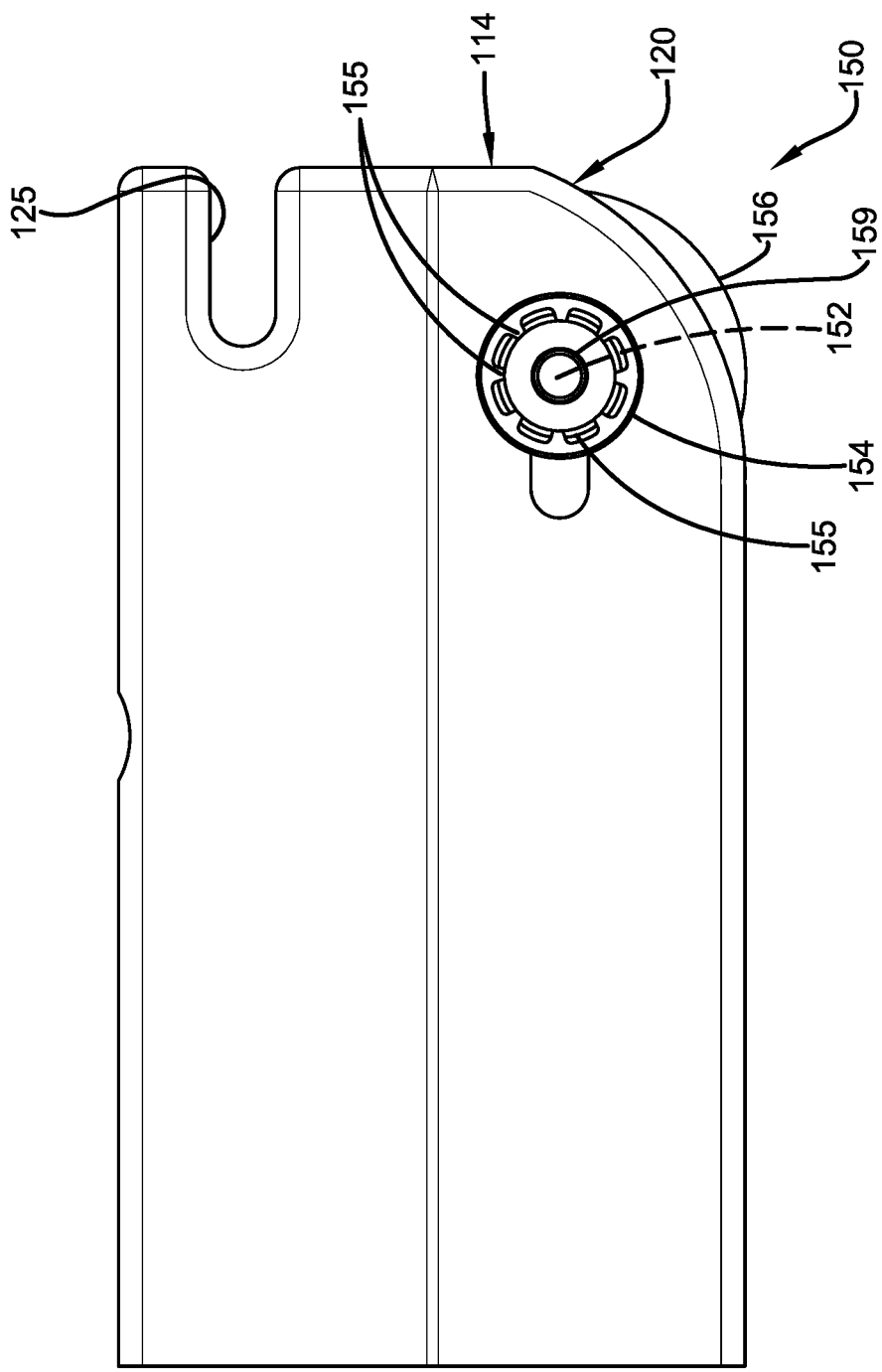
FIG. 15 illustrates a side perspective view of the rolling end of the improved wheel chock of FIG. 13.

As best illustrated in FIGS. 4-9 and 13-15, the rear or rolling end 114 of improved wheel chock 100 comprises an attachment hole or opening 116 for receipt of tether 136 to enable a user to carry the improved wheel chock 100 as a sling), and a wheel assembly housing 118. As illustrated in FIG. 15, the rolling end 114 may further comprise a side notch 125 for receiving the tether 136 as discussed infra. The wheel assembly housing 118 may also comprise a curved portion 120 (as best illustrated in FIG. 4), and a rear guard 122 (as best shown in FIG. 9). More specifically, the curved portion 120 permits the user to more easily roll or otherwise maneuver the improved wheel chock 100 in multiple directions, such as when the lifting end 104 is lifted off of the ground as illustrated in FIG. 2. The user can push, pull, or otherwise move the improved wheel chock 100 at a normal walking height, and without the need for the user to stoop or bend over, thereby reducing the possibility of injury to the user and resulting in significantly less user fatigue. As explained more fully below, the presence of the rear guard 122 helps prevent over rotation of the adjustable wheel assembly 150, and protects the wheel shaft from damage.

The rolling end 114 of improved wheel chock 100 may further comprise a receiving pocket for mating directly with either the lifting end 104, or one of the plurality of segments 126 as illustrated in FIG. 17. Alternatively, the rolling end 114 may further comprise a protruding portion for mating with either the lifting end 104, or one of the plurality of segments 126. In this manner, and as explained more fully below, the overall length of improved wheel chock 100 can be customized to suit a particular user's need or preference and a wide array of different sized vehicles and/or aircraft, thereby reducing the need to purchase, maintain and warehouse a large number of different sized wheel chocks suitable for different applications. Additionally, the interchangeability of lifting end 104, rolling end 114 and plurality of segments 126 further enables a user to replace one or more of said components if the same becomes damaged, without having to discard and purchase a whole new wheel chock, which can be both expensive and time consuming.

Each of the plurality of segments 126 is essentially an elongated member manufactured from the same material as the lifting end 104 and/or the rolling end 114, and enables the user to extend or shorten the overall length of the improved wheel chock 100 to satisfy aviation requirements, or to suit user need and/or preference. Each of the plurality of segments 126 may be of uniform or different lengths, and may also comprise a plurality of spaced apart structural ribs 128 separated by a plurality of spaced apart pockets 129, as best illustrated in FIGS. 13, 18, 19, 20 and 21. More specifically, the plurality of structural ribs 128 function to provide added support and strength to improved wheel chock 100, while the presence of spaced apart pockets 129 helps to reduce the overall weight of improved wheel chock 100, thereby making it easier to transport, deploy and/or maneuver.

Additionally, each of the plurality of segments 126 comprises a retaining pocket 130 at one end and a protruding portion 132 at an opposite end of the segment 126. The protruding portion 132 of segment 126 is configured to mate with the retaining pocket 130 of another, adjacent segment 126, or the retaining pocket of the rolling end 114. The retaining pocket 130 is likewise configured to accept the protruding portion 132 of a different, adjacent segment 126, or the protruding portion of the lifting end 104. Alternatively, the plurality of segments 126 could protrude in the opposite direction, namely from rolling end 114 to lifting end 104. Any connection between a protruding portion and a retaining pocket is then removably secured with a plurality of attachment elements 134, such bolts, screws, or similar type fasteners. It is also contemplated that the respective segments 126, lifting end 104 and/or rolling end 114 could be removably attached to one another via a friction fit, or any other attachment means known in the art.

As best illustrated in FIGS. 4-12, the improved wheel chock 100 may further comprise a mounting bracket 180, and an adjustable wheel assembly 200 integratable into the improved wheel chock 100. As best illustrated in FIG. 8, the mounting bracket 180 is preferably comprised of steel or a similarly durable material attached to the rolling end 114 of improved wheel chock 100, and within the wheel assembly pocket or housing 118. The mounting bracket 180 may be removably attached to the rolling end 114 of improved wheel chock 100 by any means commonly known in the art, such as via fasteners 181.

The adjustable wheel assembly 200 preferably comprises a shaft 202, a pin element 204, a shaft offset portion 210, and an adjusting component 214. The pin element 204 is typically a metal peg or protrusion in line with and extending approximately perpendicularly out of the shaft 202 away from mounting bracket 180. The pin element 204 further comprises a resilient washer 206 proximal to the shaft 202, and a resilient bushing 208 distal to the shaft 202, each fitting over the pin element 204. The bushing 208 and washer 206 are preferably a urethane bushing and/or washer, but may also be a spring, or some other similar flexible component. The combination of the pin element 204 and the rear guard 122 is designed to prevent over rotation of the adjustable wheel assembly 200. The pin element 204 is limited in its side movement due to its slip fit into the mounting bracket 208 receiving hole. The rear guard 122 also serves the dual purpose of protecting the shaft 202 from damage.

Figure 10:
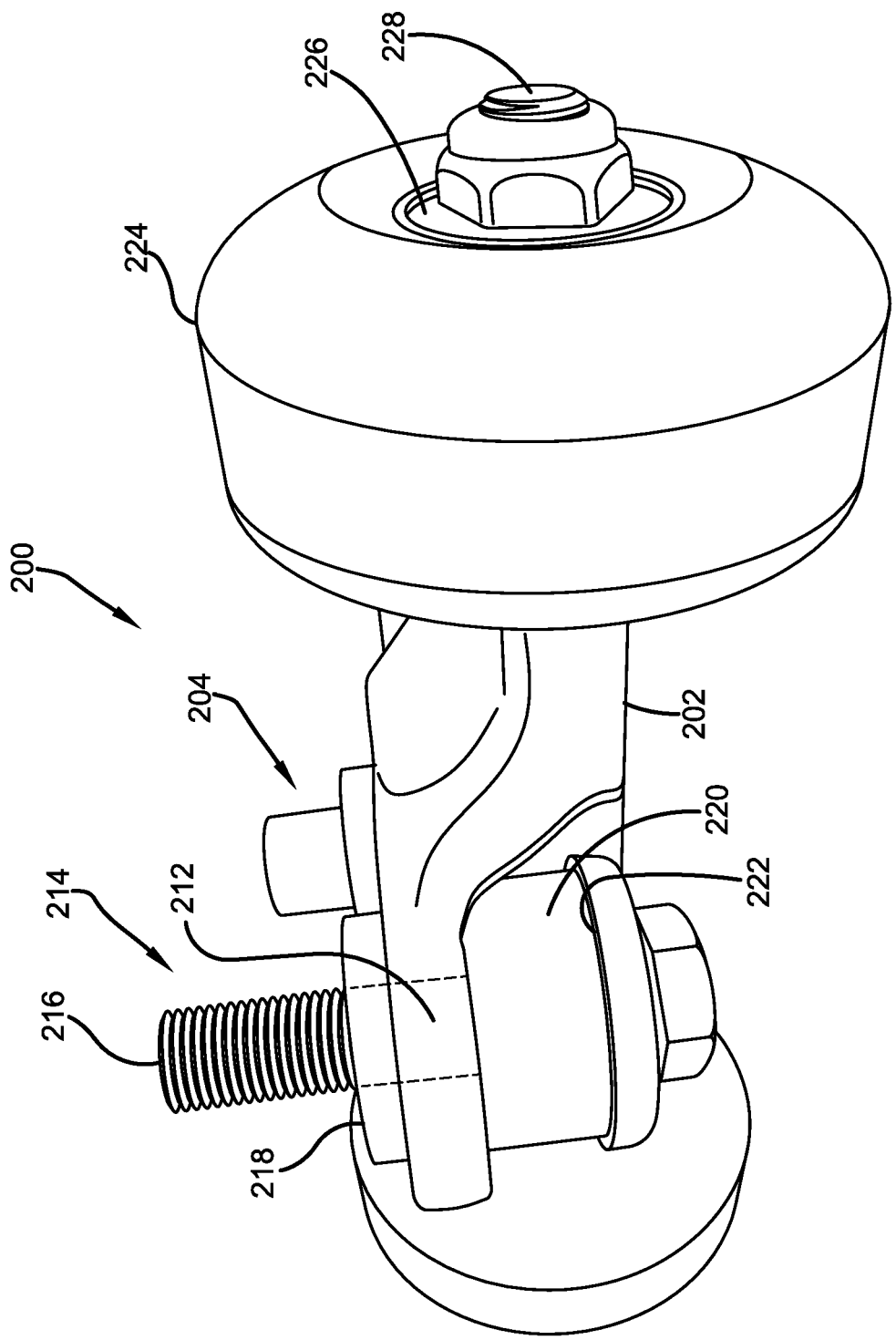
FIG. 10 illustrates a perspective view of the adjustable wheel assembly of the present invention.
Figure 11:
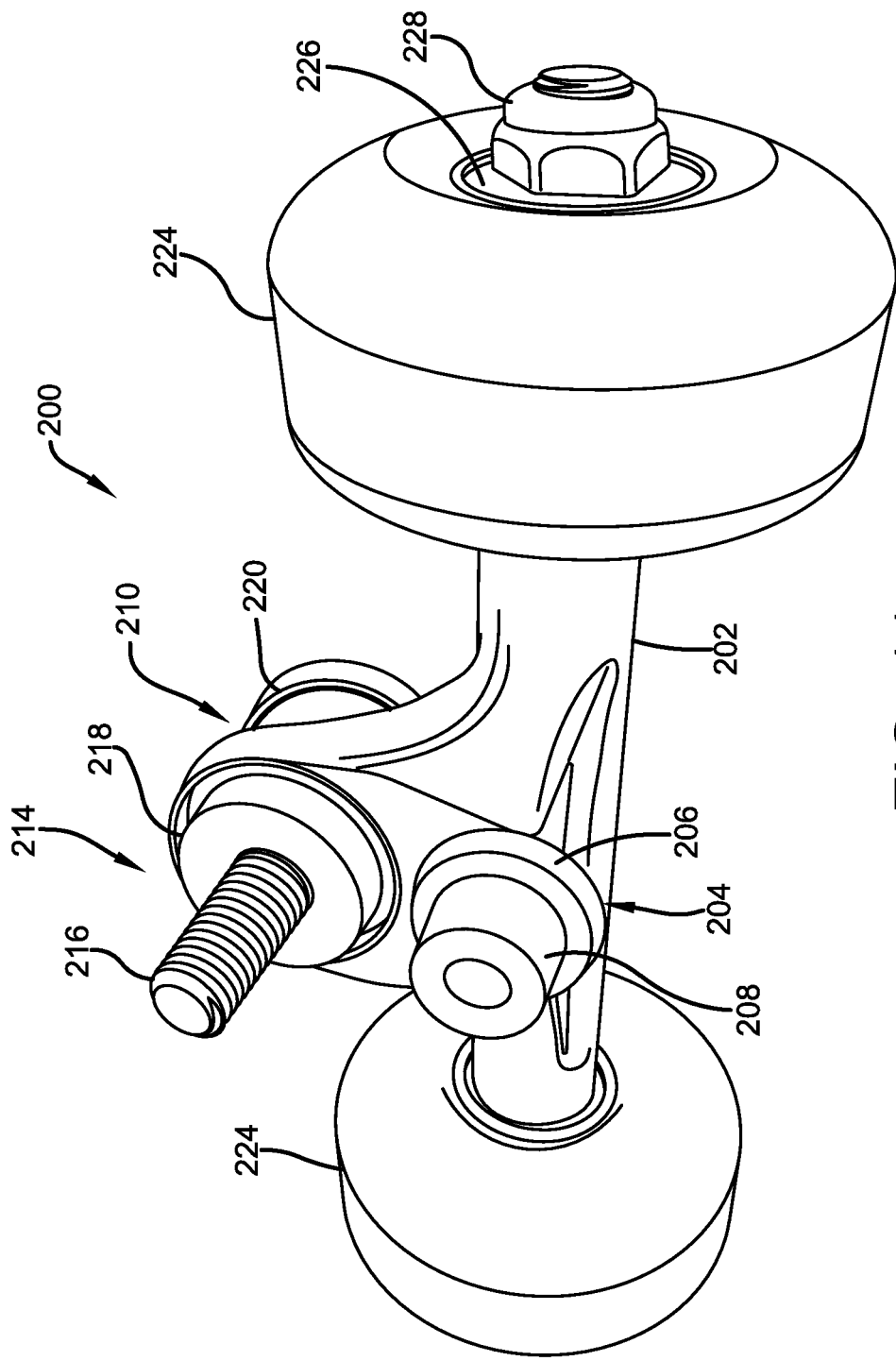
FIG. 11 illustrates a further perspective view of the adjustable wheel assembly of FIG. 10.
Figure 12:
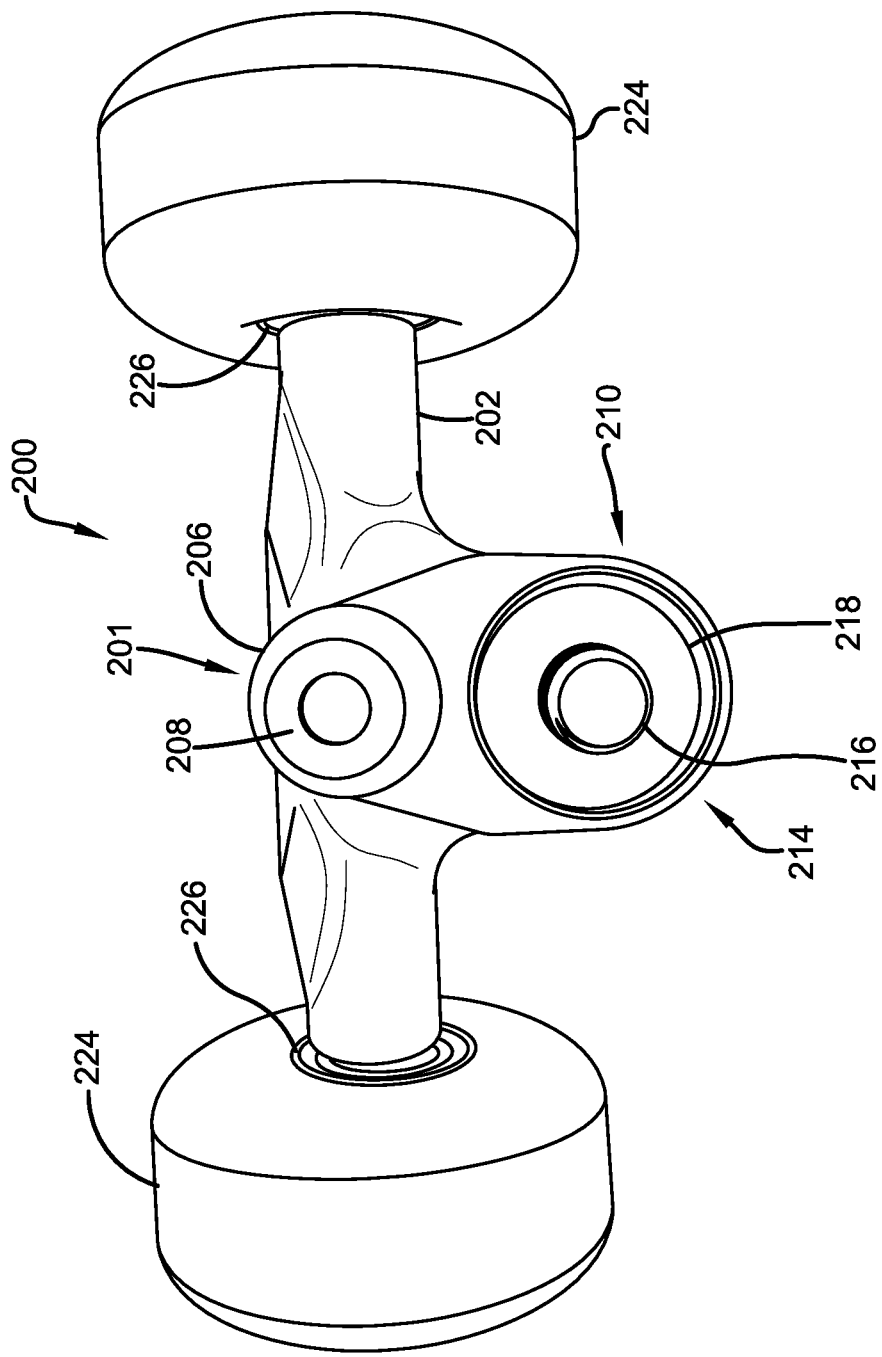
FIG. 12 illustrates a further perspective view of the adjustable wheel assembly of FIG. 10.
Figure 13:
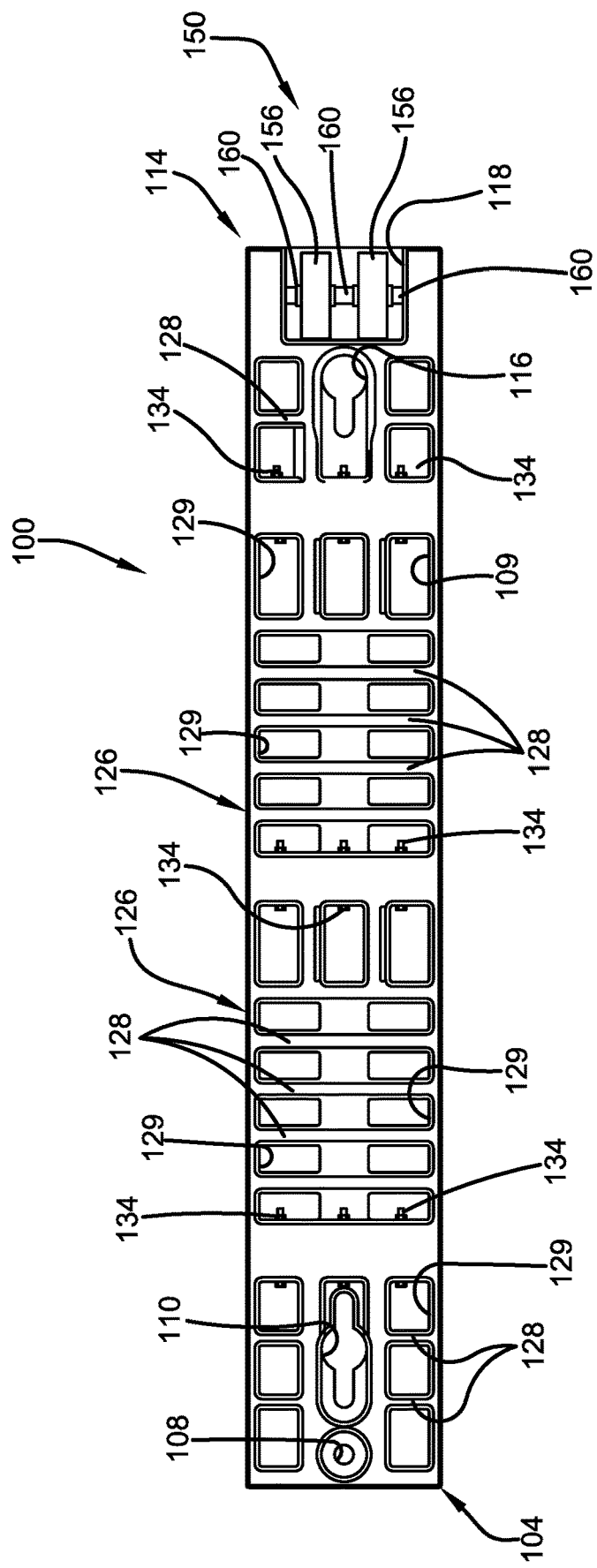
FIG. 13 illustrates a bottom perspective view of an alternative embodiment of the improved wheel chock of the present invention.

The shaft offset portion 210 preferably extends outwardly and perpendicularly from the shaft 202 and the pin element 204, and comprises a continuous hole or opening 212 approximately parallel to the pin element 204, as shown in FIG. 10. The adjustable wheel assembly 200 further comprises a pair of wheels 224 rotatably connected to the shaft 202 by a pair of bearings 226, and held in place by a pair of retaining components 228, such as nuts.

The adjusting component 214 preferably comprises a fastening element 216, a washer 218, and a bushing 220. The fastening element 216 is typically a threaded bolt or other fastener that is retained by, and moves within, the continuous opening 212 of the shaft offset portion 210. The threaded end of the bolt is attached to the mounting bracket 180 to hold the adjustable wheel assembly 200 within the wheel assembly housing 118. The washer 218 is located along the fastening element 216 between the shaft offset portion 210 and the mounting bracket 180. The bushing 220 is located along the fastening element 216 on the opposite side of the shaft offset portion 210, and is preferably held in place by a retaining cap 222. The bushing 220 and washer 206 may similarly be a urethane bushing or washer or, alternatively, a spring or other similar flexible component. The tightness or looseness of the fastening element 216 is controlled by the depth that the screw threads engage the mounting bracket 180, thereby allowing the user to adjust the flexibility of the adjustable wheel assembly 200. This flexibility within the rigid mount due to the bushing allows the wheels 224 to pivot or flex when dropped or dragged, thereby lessening the impact to the improved wheel chock 100, and prolonging its overall useful life.

The tether 136 may be looped so that the second end of the tether 136 engages the attachment hole 116 of the rolling end 114. This allows the user to use the tether 136 as a sling for carrying the wheel chock 100. The wheel chock 100 may also be used in combination with a second wheel chock 100. In this case, the tether 136 of the first wheel chock 100 is extended around the wheel being restrained, and attached to the attachment hole 116 of the second wheel chock 100. The tether 136 of the second wheel chock is similarly extended around the other side of the retained wheel, and attached to the attachment hole 116 of the first wheel chock 100 to form a system of two interlocked wheel chocks positioned on either side of the wheel. Alternatively the tether 136 may be used to engage one or both of the pair of side notches 125 of the opposing wheel chock 100.

Figure 18:
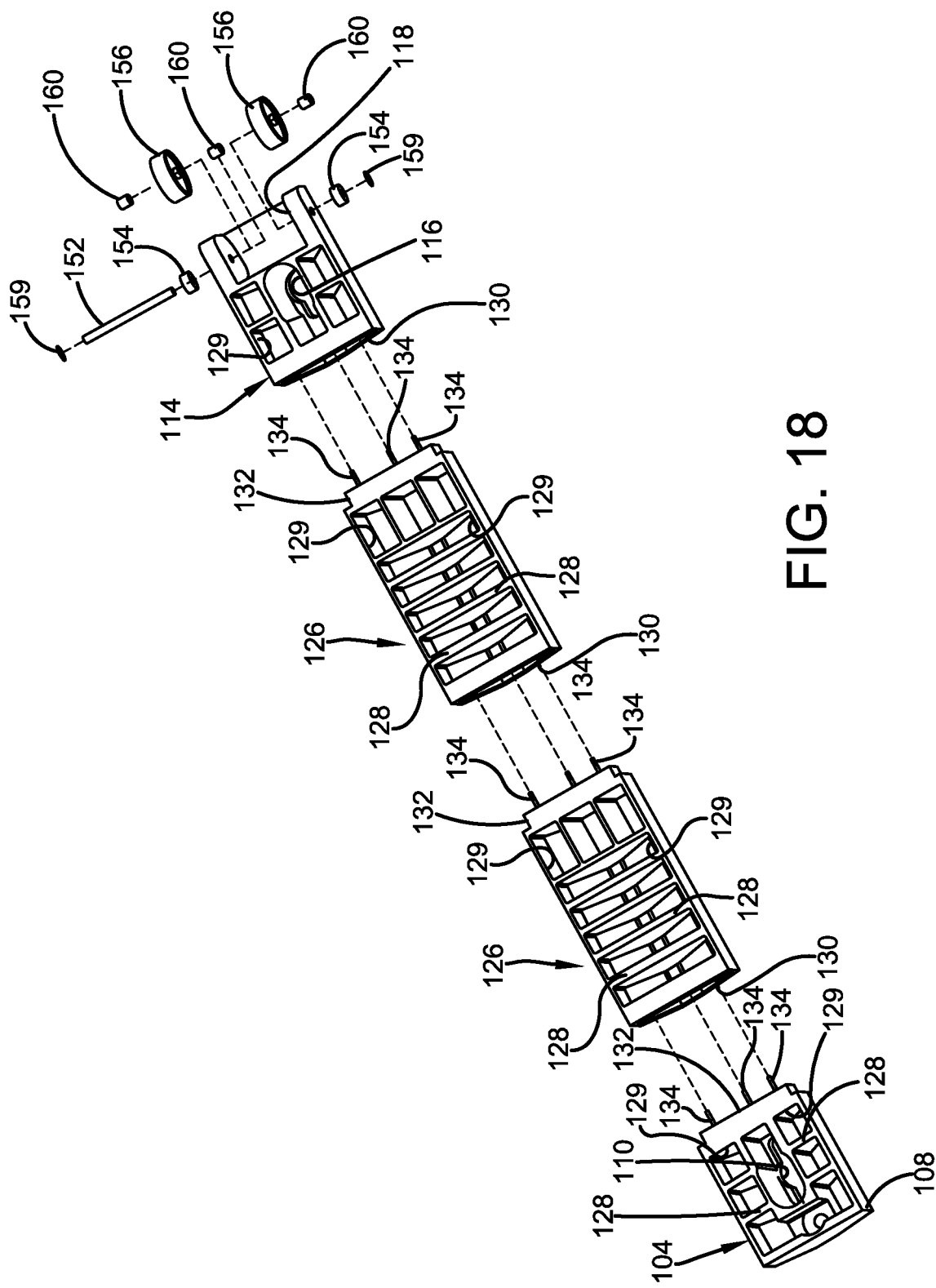
FIG. 18 illustrates an exploded, bottom perspective view of the improved wheel chock of FIG. 13.
Figure 19:
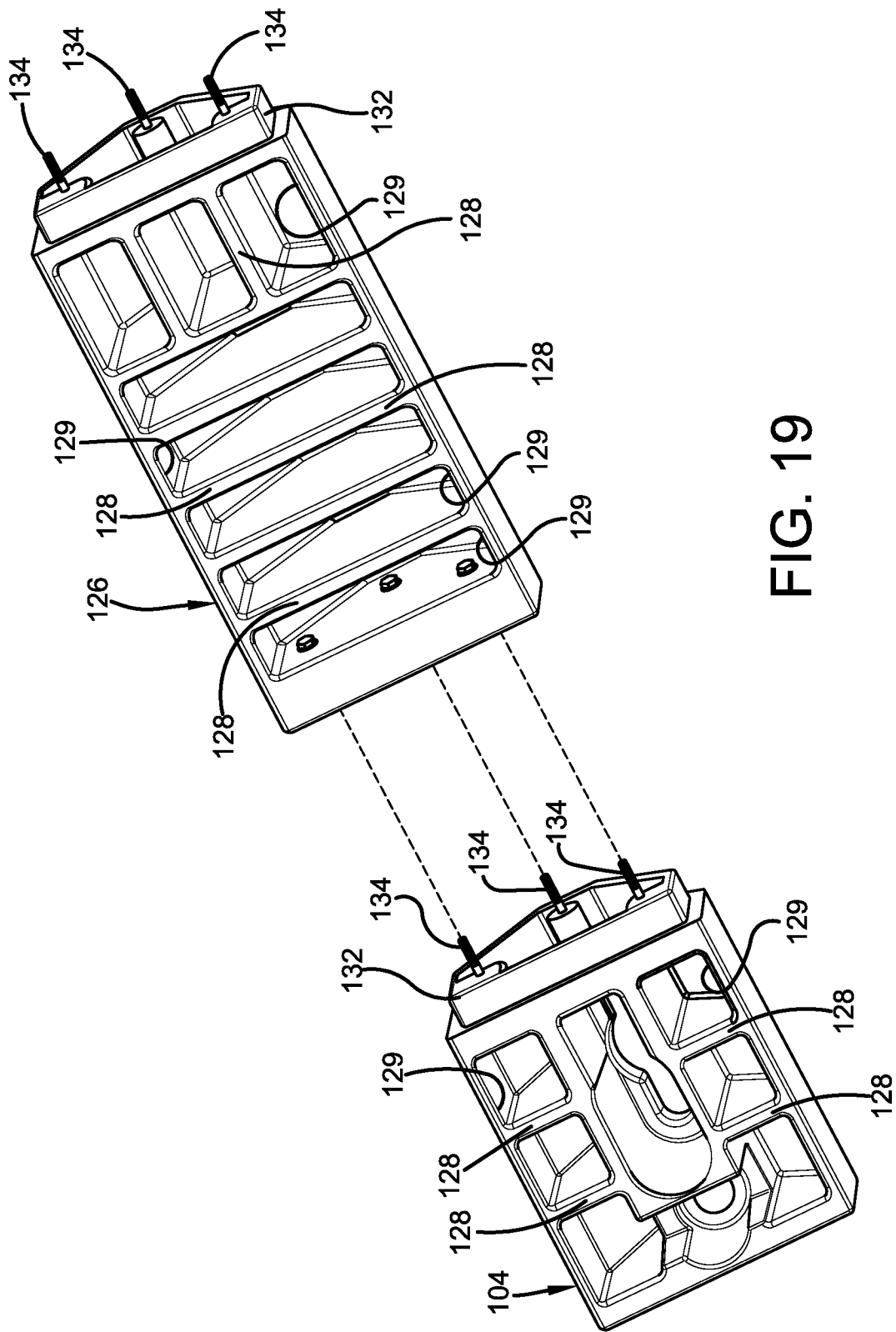
FIG. 19 illustrates a partial perspective exploded and bottom view of the front end of the improved wheel chock of FIG. 13.
Figure 20:
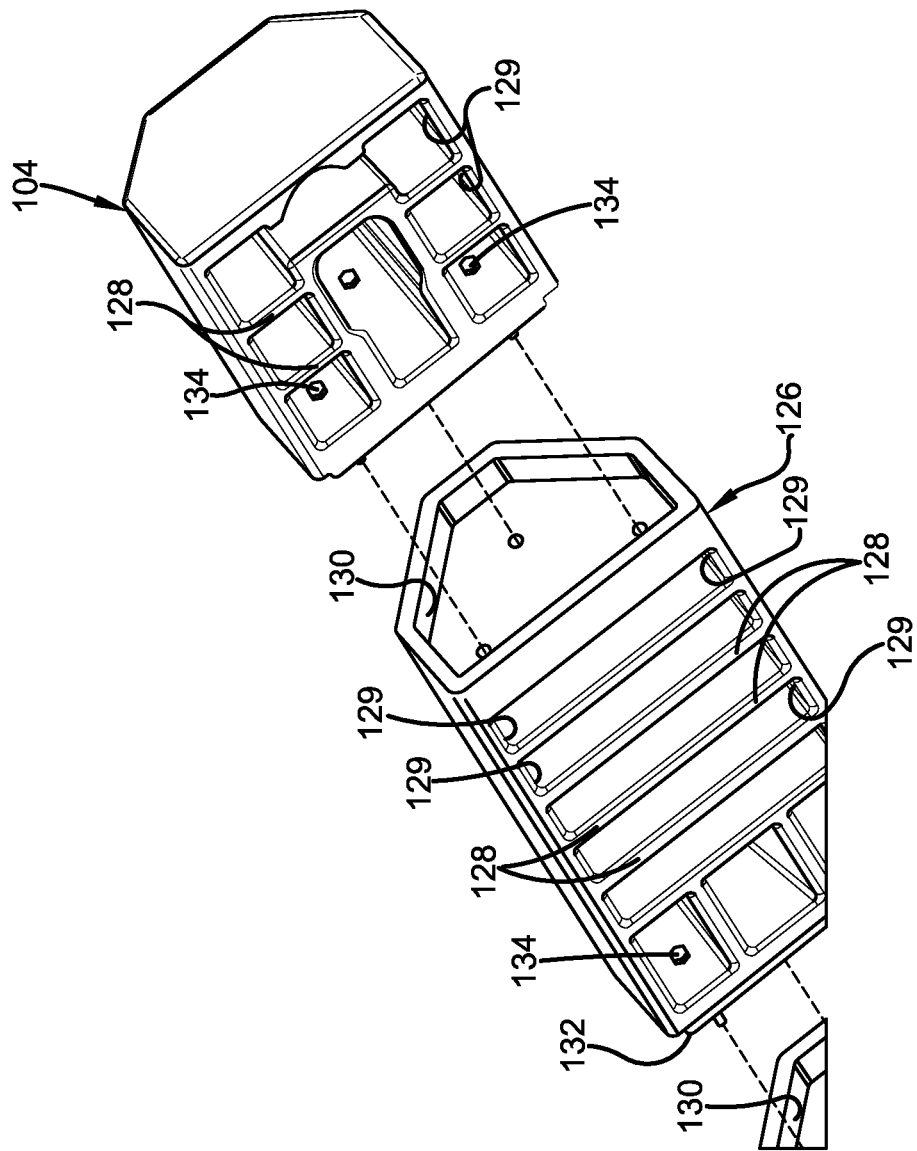
FIG. 20 illustrates a further partial perspective exploded and bottom view of the front end of the improved wheel chock of FIG. 13.
Figure 21:
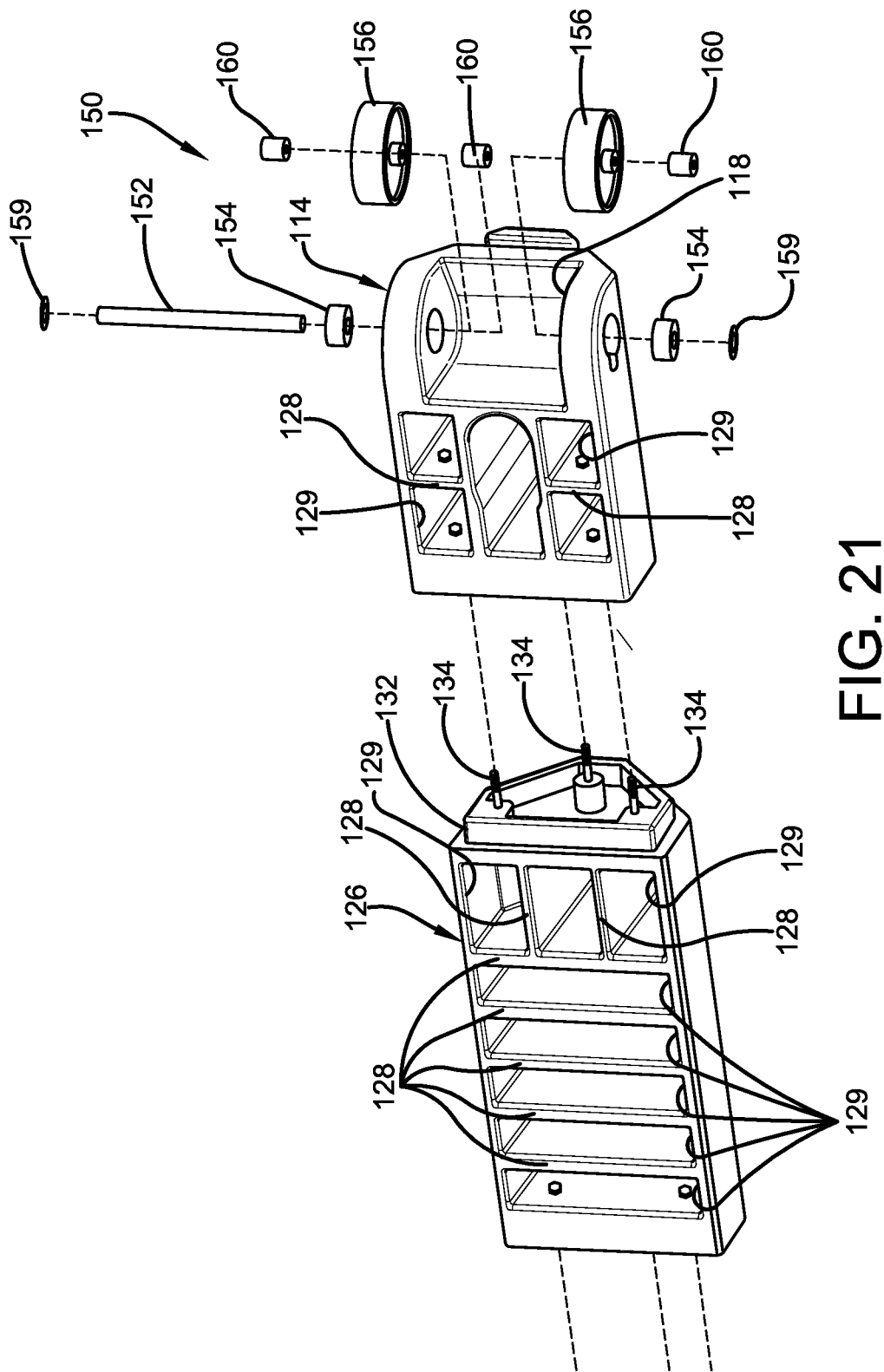
FIG. 21 illustrates a partial perspective exploded and bottom view of the rear end of the improved wheel chock of FIG. 13.

As illustrated in FIGS. 14-14 and 17-18, the alternative adjustable wheel assembly 150 is flexibly retained within the wheel assembly housing 118, and preferably comprises a shaft 152, a pair of bushings 154, and a pair of spaced apart wheels 156 but not limited to. The shaft 152 extends through and is retained by the sidewalls of the rolling end 114 by the pair of bushings 154, which also function as shock absorbers and are capped with end caps 159. More specifically, each of bushings 154 may have a plurality of radial, spaced apart fingers 155, as best shown in FIG. 15, that absorb a portion of the shock created by operation, impact or movement of the improved wheel chock 100 of the present invention. The pair of wheels 156 are located within the wheel assembly housing 118, and are rotatably connected to, and rotatable about, the shaft 152 by bearings and separated by spacers, but not limited thereto.

What has been described above includes examples of the claimed subject matter. It is, of course, not possible to describe every conceivable combination of components or methodologies for purposes of describing the claimed subject matter, but one of ordinary skill in the art may recognize that many further combinations and permutations of the claimed subject matter are possible. Accordingly, the claimed subject matter is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A wheel chock comprising:
   a lifting end and a rolling end comprising a wheel assembly housing;
   a mounting bracket removably attachable to the rolling end within the wheel assembly housing; and
   a wheel assembly attachable to the rolling end via the mounting bracket and retained within the wheel assembly housing; and
   wherein the wheel assembly comprises a shaft and a pin element in line with and extending perpendicularly outward from the shaft away from the mounting bracket and configured to prevent over rotation of the wheel assembly; and
   wherein the wheel assembly housing comprises a rear guard extending rearward configured to protect the shaft and prevent over rotation of the wheel assembly in combination with the pin element.

2. The wheel chock of claim 1, wherein the lifting end comprises a handle.

3. The wheel chock of claim 1 further comprising a tether attachable to the lifting end.

4. The wheel chock of claim 1, wherein the wheel assembly is flexible within the wheel assembly housing.

5. The wheel chock of claim 1, wherein the rolling end is curved.

6. The wheel chock of claim 1, wherein the wheel assembly further comprises a shaft offset portion extending perpendicularly outward from the shaft and the pin element, the shaft offset portion comprising a continuous opening parallel to the pin element.

7. The wheel chock of claim 6, wherein the wheel assembly further comprises an adjusting component comprising a threaded fastener movably retained within the continuous opening of the shaft offset portion and threadedly attachable to the to the mounting bracket to hold the adjustable wheel assembly within the wheel assembly housing.

8. The wheel chock of claim 1, wherein the wheel assembly further comprises a pair of spaced apart wheels.

\* \* \* \* \*